United States Patent
Wang

(10) Patent No.: US 7,015,898 B2
(45) Date of Patent: Mar. 21, 2006

(54) INPUT APPARATUS AND METHOD FOR CONFIGURING HOT KEY OF COMPUTER GAME

(75) Inventor: Chin-Ping Wang, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 358 days.

(21) Appl. No.: 10/424,795

(22) Filed: Apr. 29, 2003

(65) Prior Publication Data

US 2003/0224843 A1    Dec. 4, 2003

(30) Foreign Application Priority Data

May 29, 2002    (TW) ............................ 91111478 A

(51) Int. Cl.
*G09G 5/00*    (2006.01)
(52) U.S. Cl. .................... 345/168; 273/148 B; 463/37; 341/22
(58) Field of Classification Search ........ 345/168–172; 341/22, 23; 463/1, 36, 37; 273/148 B, 148 R; 400/472, 476, 480, 485
See application file for complete search history.

(56) References Cited

U.S. PATENT DOCUMENTS

| 4,633,227 A | * | 12/1986 | Menn | ........................... 341/22 |
| 2002/0084919 A1 | * | 7/2002 | Green | ........................ 341/22 |

OTHER PUBLICATIONS

SimCity 3000 HotKeys, http://www.sc3000.com/knowledge/showarticle_print.cfm?id=436&openItemID=cid.23, cid.1,cid.28.*

* cited by examiner

*Primary Examiner*—Regina Liang
(74) *Attorney, Agent, or Firm*—Birch,Stewart,Kolasch & Birch,LLP

(57) ABSTRACT

An input apparatus includes a profile key, a hot key, and a key for selectively inputting a character and a computer-game operating action. The profile key corresponds to a default profile including an extension code for the key to input the computer-game operating action. The hot key is configured to selectively switch the key to input the character and the computer-game operating action. When the profile key is actuated and the hot key is at a first status, the input apparatus outputs the extension code so that the key inputs the computer-game operating action. When the hot key is at a second status, the input apparatus outputs a standard key code so that the key inputs the character. A method of configuring the key as a hot key of a computer game is also provided.

18 Claims, 4 Drawing Sheets

INPUT APPARATUS AND METHOD FOR CONFIGURING HOT KEY OF COMPUTER GAME

CROSS REFERENCE TO RELATED APPLICATIONS

This application claims priority to Taiwan Patent Application No. 091111478 entitled "Input Apparatus and Method for Controlling Hot Key of Computer Game", filed May 29, 2002.

FIELD OF INVENTION

The present invention generally relates to an input apparatus and a method for configuring hot keys of a computer game and, more particularly, to an input apparatus having keys selectively inputting characters and computer-game operating actions and a method for configuring standard keys as hot keys of a computer game.

BACKGROUND OF THE INVENTION

The development of the electronic technology and the information technology improves the popularity of computer games. More particularly, as the speed of the central processing unit (CPU) is improved and the wait of the Internet on-line process is reduced, the on-line computer game blossoms into one of most popular games in this century. The greatest charm of the on-line computer game is the interaction with other players other than the single player operation.

In general, when a user initiates the game program on a personal computer, keys of the keyboard are configured to serve as hot keys of the game. However, different computer games usually have different operating actions and hot key settings. Hot keys are generally in a large number and incompatible for different games. Therefore, it is inconvenient for the user to memorize and operate all hot keys corresponding to different games. Furthermore, when the computer game is an on-line computer game for more than one player, the keyboard must not only serve as a hot key input device to input computer game operating actions, but also a standard keyboard to input standard characters for player interactions. Therefore, how to improve the speed of switching the functions of keys, which can selectively input computer game operating actions and standard characters, is another issue of playing on-line computer games.

Moreover, the hot key configured to input a computer game operating action is usually a combination of keys. For example, two or more than two keys are generally activated at the same time to input one computer game operating action. Therefore, the player has difficulties not only in memorizing every hot key, but also in operating multiple keys at the same time. Furthermore, the hot keys corresponding to different computer-game operating actions are usually randomly disposed in different areas of the keyboard, which reduces the flexibility and convenience of operation.

Therefore, there is a desire to provide an input apparatus and a method for configuring a key to correspond to a computer game operating action to resolve the problems of prior arts.

SUMMARY OF THE INVENTION

It is therefore an aspect of the present invention to provide an input apparatus, which has a computer-game operating key function and a standard key function configured in a single key. This approach is achieved by changing the status of a hot key so that a user can switch the computer operating key function back to the standard key function to communicate with other players when playing a computer game.

It is another aspect of the present invention to provide an input apparatus having profile keys corresponding to different profiles so that a user can select the profile key to configure hot keys for different computer games.

It is a further aspect of the present invention to provide a method for configuring hot keys corresponding to computer-game operating actions so that a user can concentrate hot keys in an area of a keyboard.

It is another further aspect of the present invention to provide a method for configuring a key to correspond to a computer-game operating action, so that a single key can input the computer-game operating action, which is conventionally inputted by activating multiple keys (or a combination of keys) at the same time.

In a first embodiment, the input apparatus of the present invention includes a key, a profile key, and a hot key. The key is configured to selectively input a character and a computer-game operating action. The profile key corresponds to a default profile, which includes an extension code for the key to input the computer-game operating action. The hot key is configured to selectively switch the key to input the character and the computer-game operating action. When the profile key is actuated and the hot key is at a first status, the input apparatus outputs the extension code so that the key inputs the computer-game operating action. When the hot key is at a second status, the input apparatus outputs a standard key code so that the key inputs the character. The input apparatus further includes a display element, which indicates the status of the hot key.

In another embodiment, the present invention provides a method for configuring a key to correspond to a computer-game operating action. The method includes the step of providing a plurality of default profiles. Each default profile corresponds to a game title and includes an operating function table. Each operating function table includes a computer-game operating action, which corresponds to a key. Game titles are displayed to allow a user to select one default profile. The operating function table of the selected default profile is displayed to allow the user to scrutinize. Whether the user accepts the operating function table is then determined. When the operating function table is accepted, a profile number is assigned to the default profile. When the operating function table is rejected, a profile is established. Then, the profile number is selected, so that the key corresponding to the computer-game operating action is activated.

The step of establishing the profile includes establishing a new game title and a new operating function table and assigning the profile number to the established profile. The established operating function table includes computer-game operating actions. Each of the computer-game operating actions corresponds to a single key, which serves as a hot key of a computer game. These keys can be concentrated in an area of a keyboard.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and, the accompanying drawings, which are given by way of illustration only, and thus are not limitative of the present invention, and wherein.

DETAILED DESCRIPTION OF THE INVENTION

Figure 1:
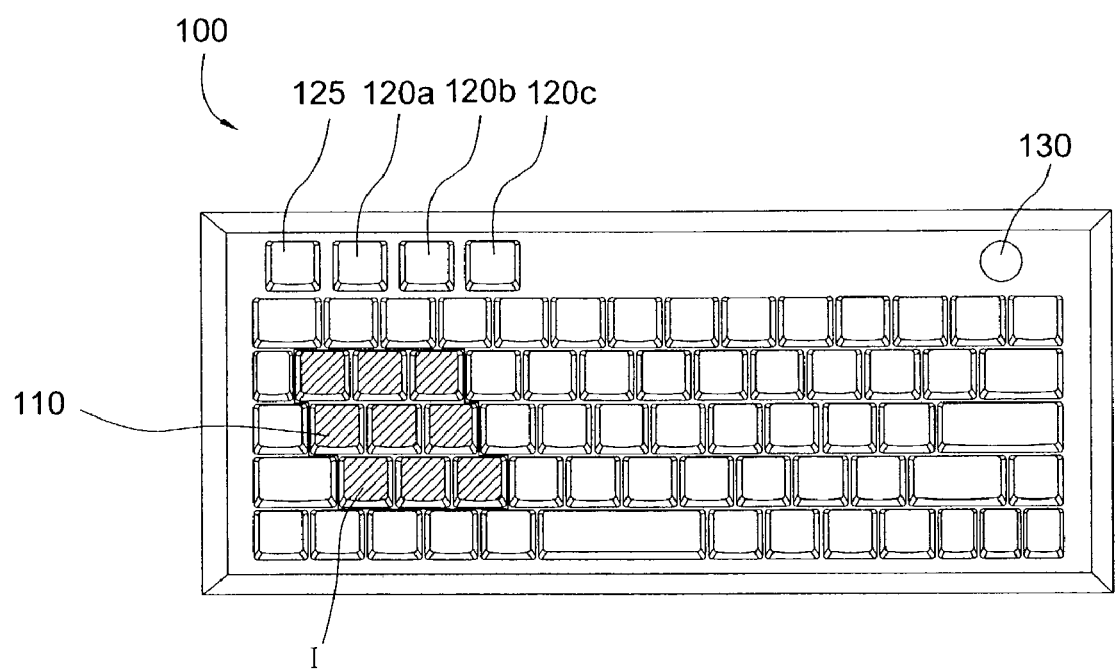
FIG. 1 illustrates a schematic view of an input apparatus in one embodiment of the present invention.

An input apparatus and a method for configuring a key to correspond to a computer-game operating action are provided. Referring to FIG. 1, in one embodiment of the present invention, the input apparatus 100 includes a plurality of keys 110, a profile key, such as key 120a, and a switch hot key 125. Every key 110 can be configured to selectively input a character and a computer-game operating action. When the key 110 is configured to input the character, the key 110 is defined to serve as a standard key. When the key 110 is configured to input the computer-game operating action, the key 110 is defined to serve as a hot key of a computer game. The profile key 120a corresponds to a default profile, such as profile "A", which includes an extension code for the key 110 to input the corresponding computer-game operating action. The switch hot key 125 is configured to selectively switch the key 110 to input the character and the computer-game operating action.

When the profile key 120a is actuated and the switch hot key 125 is at a first status, the input apparatus 100 outputs the extension code so that the key 110 inputs the computer-game operating action. When the switch hot key 125 is at a second status, the input apparatus 100 outputs a standard key code so that the key 110 inputs the character. In other words, when the profile key 120a is actuated and the switch hot key 125 is at the state of transferring the extension code, keys 110 are configured to input corresponding computer-game operating actions, such as "attack", "advance", "communicate with alliance", "communicate with enemy", and the like as appropriate. In the middle of playing an on-line computer game, when inputting characters is required, for example, when communicating with alliance and/or enemy, changing the status of the switch hot key 125 can change the function of keys 110 to input characters. In other words, the input apparatus 100 has a computer-game operating key function and a standard key function configured in a single key 110. In such configuration, by changing the status of the switch hot key 125 a user can switch the computer operating key function back to the standard key function to communicate with other players when playing the on-line computer game.

The input apparatus 100 further includes a display element 130, such as a light emitting diode (LED), which indicates the status of the switch hot key 125. For example, when the switch hot key 125 is at the state of transferring the extension code (or at the first status), the LED illuminates. When the switch hot key 125 is at the state of transferring the standard key code, the LED darkens. The input apparatus 100 further includes more than one profile keys, such as 3 profile keys, 120a, 120b, and 120c shown in FIG. 1. Each profile keys (120a, 120b, or 120c) independently corresponds to a different profile, such as profile A, B, and C. In such arrangement, in response to different computer games (A, B, or C), the user can select different profile key to activate corresponding hot keys of the selected game.

Figure 2:
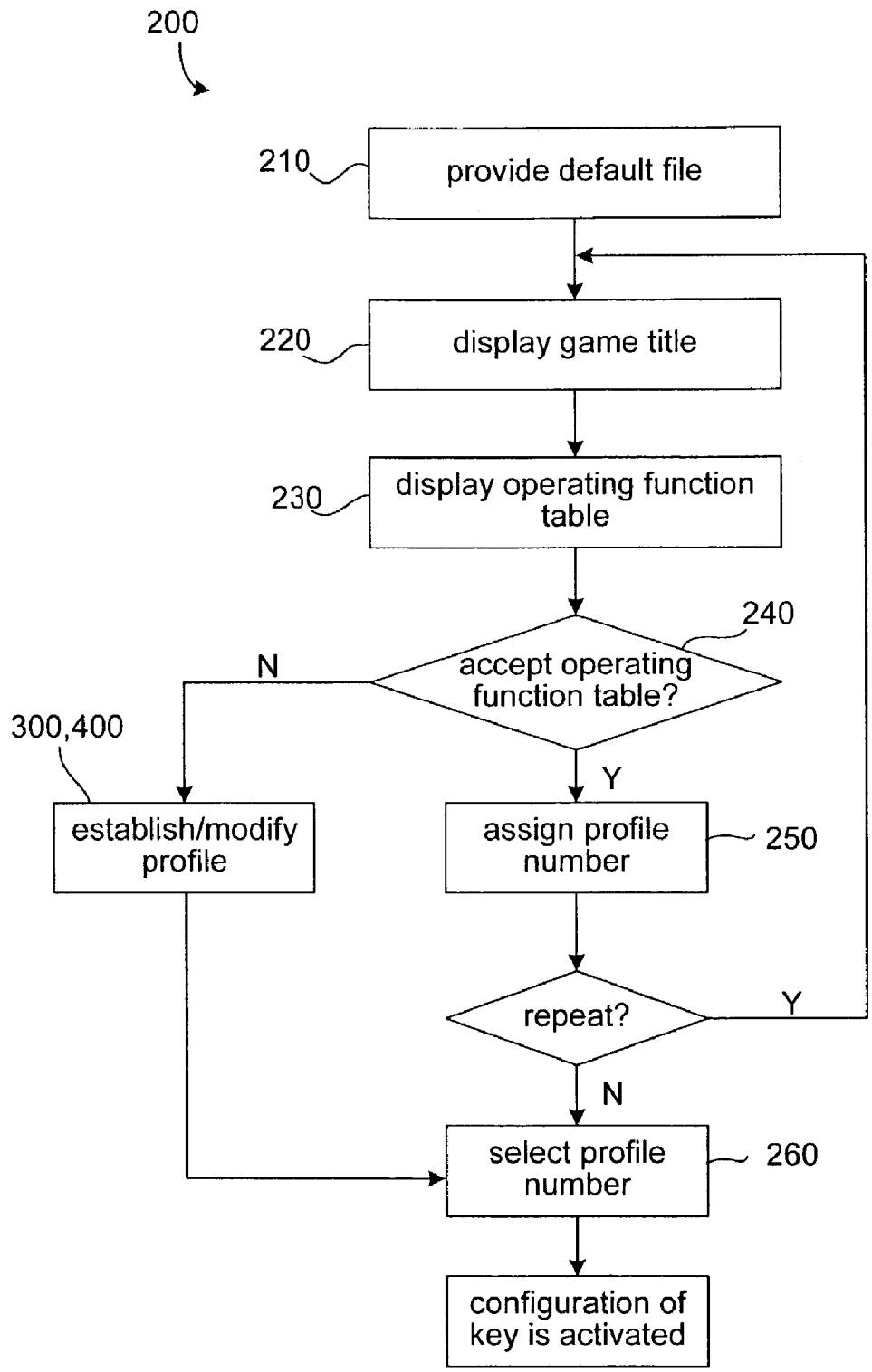
FIG. 2 illustrates a flow diagram of configuring a key corresponding to a computer-game operating action of the present invention.

Referring to FIG. 2, a method for configuring a key to correspond to a computer-game operating action is illustrated. The method includes the step of providing at least one default profile (step 210). For example, 3 different default profiles respectively having game titles A, B, and C for 3 different computer games are provided. Every default profile, such as profile A, has a game title and an operating function table, which includes at least one default computer-game operating action corresponding to a default key. For example, the operating function table of profile A can includes 4 computer-game operating actions, such as "attack", "advance", "communicate with alliance", and "communicate with enemy". Each of the four computer-game operating actions respectively corresponds to a single default key. It is noted that the numbers of computer-game operating actions are not limited to the number depicted in the exemplary embodiment.

In step 220, the game title, such as A, B, and C, is displayed to allow a user to select one default profile. For example, when the user selects the game title A, the corresponding profile A is selected.

In step 230, the operating function table of the selected profile is displayed. In other words, the operating function table indicating relationship between the computer-game operating action and the default key is displayed to allow the user to scrutinize. For example, the computer-game operating action of the profile A, which is conventionally configured by a combination of keys, is displayed to allow the user to scrutinize the corresponding default key.

In step 240, whether the user accepts the operating function table is determined. For example, when the computer-game operating action corresponds to the default key, the operating function table is accepted. When the computer-game operating action does not correspond to the default key, the operating function table is rejected.

In step 250, when the user accepts the operating function table, a profile number is assigned to the default profile. For example, when the user accepts the computer-game operating action corresponding to the default key of the profile A, the profile number, such as "1", is assigned to the profile A.

In step 260, the profile number is selected, so that the default key corresponding to the computer-game operating action is activated. For example, when the profile number "1", is selected, the default key is configured to input the computer-game operating actions of the game A. Furthermore, the profile number "1" can correspond to the profile key 120a shown in FIG. 1. In other words, when the profile key 120a is actuated, the profile number "1" is selected. When the switch hot key 125 is activated, the input apparatus 100 will transfer the extension code according to the operating function table of the profile A so that the key 110 serves as a hot key of the computer game A.

The method further includes the step of repeating steps 210 to 240 when more than one default profile needs to be assigned a corresponding profile number. For example, steps 210 to 240 is repeated so that computer games A, B, and C are respectively assigned a profile number, such as "1", "2", and "3".

Figure 3:
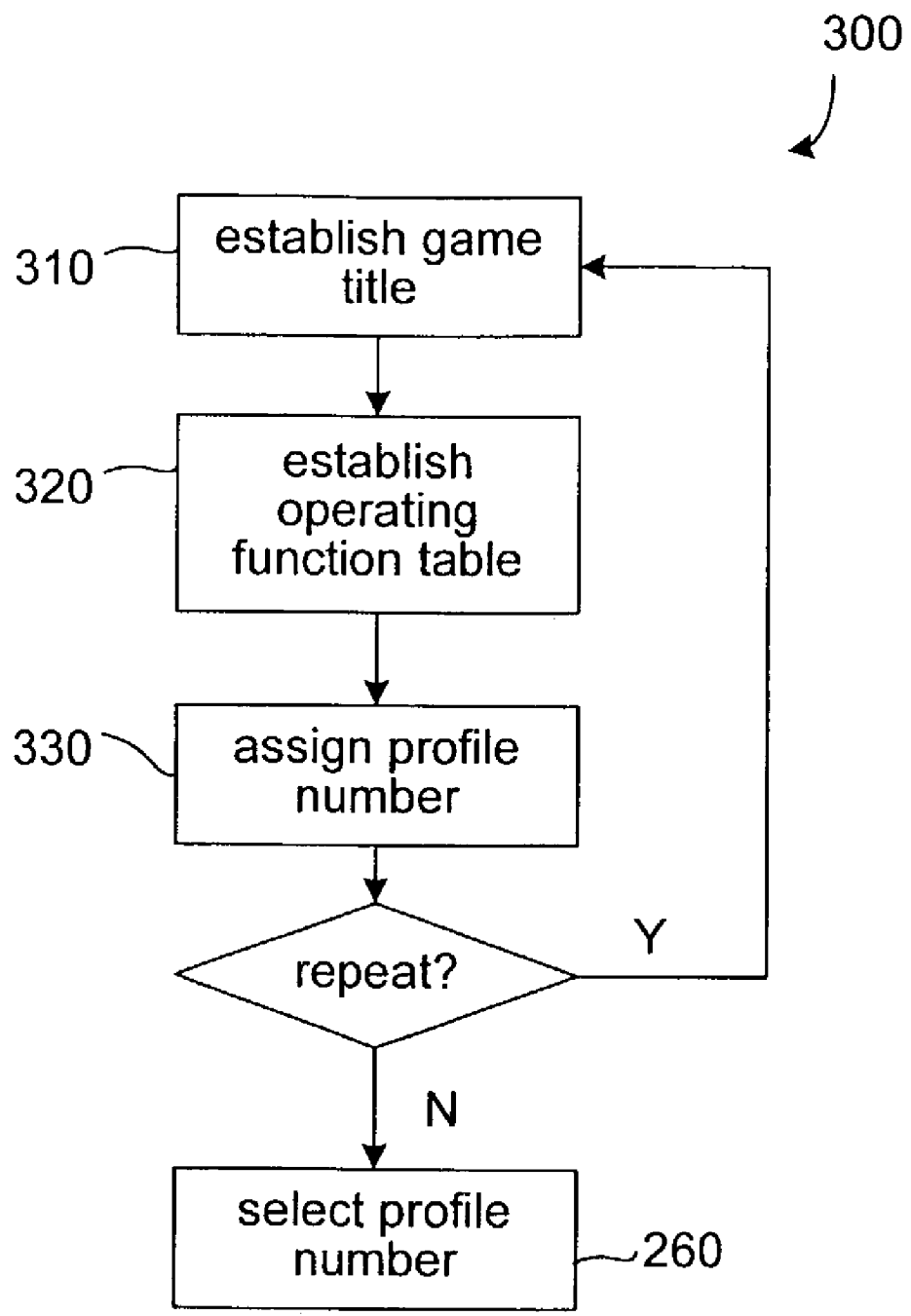
FIG. 3 illustrates a flow diagram of stabling a profile of the present invention.

The method further includes the step of establishing a profile when the operating function table is rejected. FIG. 3 illustrates a flow chart 300 of establishing the profile.

The profile includes a game title and an operating function table, which includes a computer-game action corresponding to a key. The game title is established in step 310, which includes the step of inputting a new game title or selecting desired one from a plurality of default game titles.

In step 320, the operating function table is established, so that the computer-game operating action corresponds to the desired key. For example, when the operating action, "attack", of the computer game A requires a combination of keys "Ctrl+Alt+A", virtual keys or standard keys of "Ctrl", "Alt", and "A" are selected to represent the operating action "attack" in the operating table. A single key "X" is selected to correspond to the combination of keys "Ctrl+Alt+A". Therefore, the key "X" serves as a hot key representing the operating action "attack" when the profile A is selected. In another example, when the operating action "communicate with alliance" of the computer game A requires a combination of keys "Ctrl+Alt+B", virtual keys or standard keys of "Ctrl", "Alt", and "B" are selected to represent the operating action "communicate with alliance". A single key "Y" is selected to correspond to the combination of keys "Ctrl+Alt+B". Therefore, the key "Y" serves as a hot key representing the operating action "communicate with alliance" when the profile A is selected.

To configure a single key corresponding to an operating action requiring a combination of keys can use the technique of providing the single key with a standard key code and an extension code. The extension code is utilized to input the operating action when the key serves as a hot key of the computer game. In such configuration, different operating actions or communication objects, which conventionally require combinations of keys, can be configured to respectively correspond to a different key in one operating function table. Furthermore, all keys corresponding to different computer-game operating actions can be concentrated in an area of a keyboard. For example, as the area "I" shown in FIG. 1, 9 keys corresponding to 9 different operating actions are concentrated in the area "I", so that the user can easily operate the keys when playing the computer game.

In the step 330, a profile number is assigned to the established profile. In other words, when the user accomplishes the establishment of the game title and the configuration of the operating function table, a profile number is assigned to the established profile. The method further includes the step of repeating steps 310 to 330, so that different profiles for different games are established and assigned a corresponding profile number. When the profile number is selected in step 260, keys are configured to input the computer-game operating actions as configured in the established profile.

Figure 4:
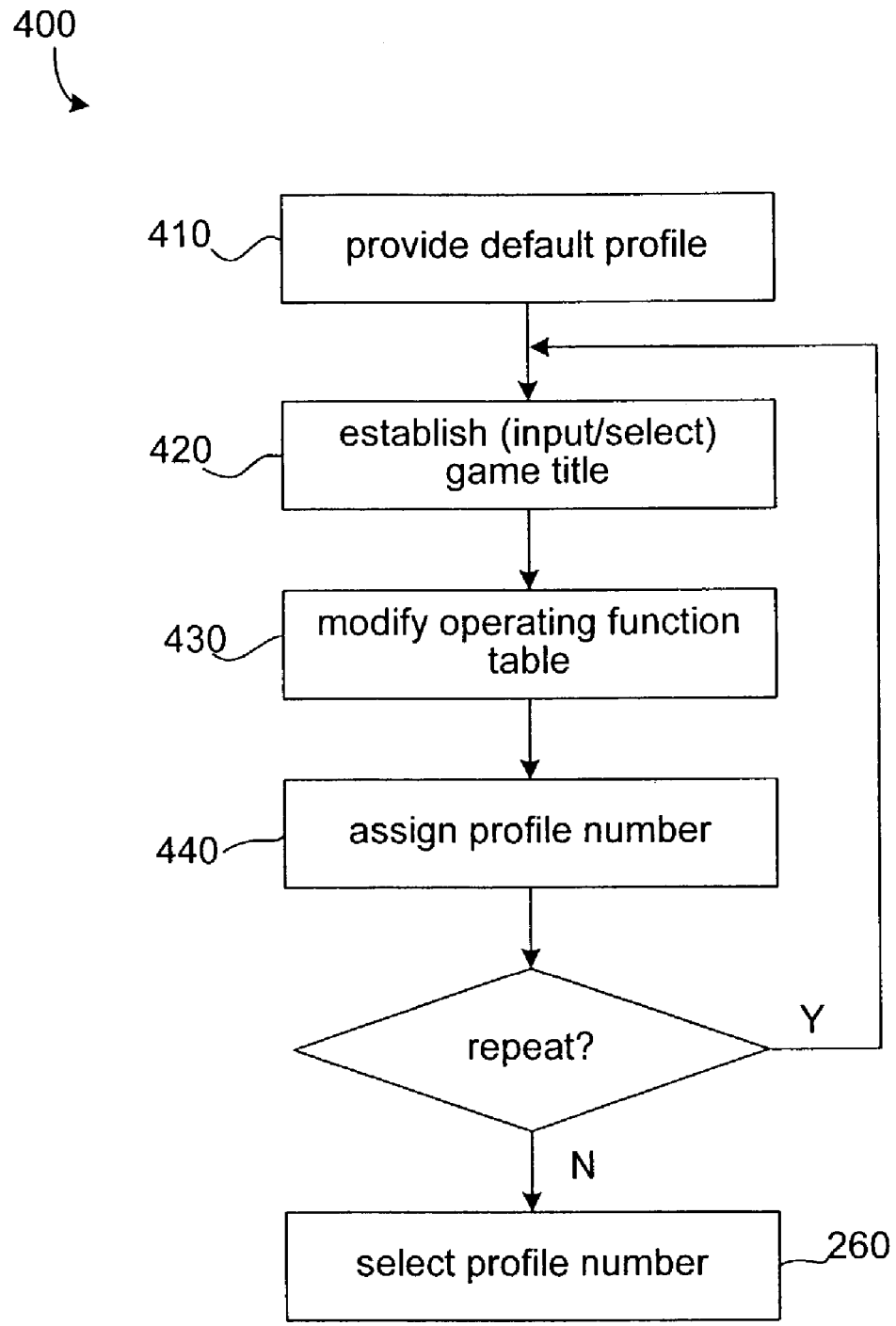
FIG. 4 illustrates a flow diagram of modifying a default profile of the present invention.

FIG. 4 illustrates a flow chart 400 of modifying a default profile. The method includes the step 410 of providing a default profile, which includes a default game title and a default operating function table. The default operating function table includes a computer-game operating action corresponding to a default key. In step 420, the game title is established by inputting a new title or accepting the default title. In step 430, the operating function table is established by changing the computer operating action to correspond to a selected key instead of the default key. In step 440, a profile number is assigned to the modified profile. The method further includes the step of repeating steps 410 to 440, so that different profiles for different games are established and assigned a corresponding profile number. When the profile number is selected, keys configured in the operating function table input the corresponding computer-game operating actions.

The present invention provides default profiles, which include operating function tables having computer-game operating actions corresponding to different keys, so that a user can select any default profile that fits his/her need. The present invention also allow the user to establish his/her own profile for a computer game, so that the user can arrange the operating actions to correspond to any key in any place as he/she feels comfortable.

Although specific embodiments have been illustrated and described, it will be obvious to those skilled in the art that various modifications may be made without departing from what is intended to be limited solely by the appended claims.

What is claimed is:

1. An input apparatus, comprising:
   a key for selectively inputting a character and a computer-game operating action;
   a profile key corresponding to a default profile, said default profile comprising an extension code for said key to input said computer-game operating action; and
   a hot key for selectively switching said key to input said character and said computer-game operating action;
   wherein said input apparatus outputs said extension code so that said key inputs said computer-game operating action when said profile key is actuated and said hot key is at a first status, and
   wherein said input apparatus outputs a standard key code so that said key inputs said character when said hot key is at a second status.

2. The input apparatus according to claim 1 further comprising a display element for indicating the status of said hot key.

3. A method for configuring a computer-game operating action corresponding to a key, comprising:
   establishing a profile, said profile comprising a game title and an operating function table, said operating function table including said computer-game operating action corresponding to said key;
   assigning a profile number to said profile; and
   selecting said profile number, so that said key corresponding to said computer-game operating action is activated.

4. The method according to claim 3, wherein said step of establishing said profile comprises:
   establishing said game title; and
   establishing said operating function table comprising M computer-game operating actions, each of said M computer-game operating actions corresponding to a key.

5. The method according to claim 4, wherein all keys corresponding to said M computer-game operating actions are concentrated in an area of a keyboard.

6. The method according to claim 3, wherein said step of establishing said profile comprises:
   providing a default profile comprising a default game title and a default operating function table, said default operating function table comprising said computer-game operating action corresponding to a default key;
   establishing said game title; and
   establishing said operating function table, so that said computer-game operating action corresponds to said key.

7. The method according to claim 6, wherein said step of establishing said game title comprises accepting said default game title as said game title or inputting a title as said game title.

8. The method according to claim 6, wherein said step of establishing said operating function table comprises changing content of said default operating function table, so that said computer-game operating action corresponds to said key.

9. A method for providing a user to configure a key to correspond to a computer-game operating action, comprising:
providing a default profile comprising a default operating function table, said operating function table including a default computer-game operating action corresponding to a default key;
determining whether said default operating function table is accepted by the user;
assigning a profile number to said default profile when said default operating function table is accepted; and
selecting said profile number, so that said key corresponding to said computer-game action is activated.

10. The method according to claim 9, wherein said default profile corresponds to a default game title, and said step of determining whether said default operating function table is accepted comprises:
displaying said default game title;
displaying said default operating function table indicating relationship between said default computer-game operating action and said default key; and
determining whether said default key is said key;
said default operating function table is accepted when said default key is said key;
said operating function table is rejected when said default key is not said key.

11. The method according to claim 9 further comprising a step of establishing a profile when said default operating function table is rejected.

12. The method according to claim 11, wherein said step of establishing said profile comprises:
establishing said profile, said profile comprising a game title and an operating function table, said operating function table including said computer-game action corresponding to said key; and
assigning said profile number to said profile.

13. The method according to claim 12, wherein said step of establishing said profile comprises:
establishing said game title; and
establishing said operating function table comprising M computer-game operating actions, each of said M computer-game operating actions corresponds to a key.

14. The method according to claim 13, wherein all keys corresponding to M computer-game operating actions are concentrated in an area of a keyboard.

15. The method according to claim 12, wherein said step of establishing said profile comprises:
providing a second default profile comprising a second default game title and a second default operating function table, said second default operating function table including said computer-game operating action corresponding to a second default key;
establishing said game title; and
establishing said operating function table, so that said computer-game operating action corresponds to said key.

16. The method according to claim 15, wherein said step of establishing said game title comprises accepting said second default game title as said game title or inputting a title as said game title.

17. The method according to claim 15, said step of establishing said operating function table comprises changing content of said second default operating function table, so that said computer-game operating action corresponds to said key.

18. A method for providing a user to select a key to correspond to a computer-game operating action, comprising:
providing M default profiles, each of said M default profiles corresponding to a default game title of M default game titles, and each default profile comprising an default operating function table, said default operating function table comprising a default computer-game operating action corresponding to a default key;
displaying said M default game titles to allow said user to select one default profile;
displaying said default computer-game operating action corresponding to said key of said selected default profile to allow said user to scrutinize;
determining whether said default operating function table is accepted by the user;
assigning a profile number to said default profile when said default operating function table is accepted by the user, and establishing a profile when said default operating function table is rejected; and
selecting said profile number, so that said key corresponding to said computer-game operating action is activated;
wherein said step of establishing said profile comprises:
establishing a game title;
establishing an operating function table comprising N computer-game operating actions, one of said N computer-game operating actions corresponding to said key of N keys, N keys corresponding to N computer-game operating actions are concentrated in an area of a keyboard; and
assigning said profile number to said profile.

* * * * *